United States Patent
Tanaka

(10) Patent No.: US 12,385,886 B2
(45) Date of Patent: Aug. 12, 2025

(54) SUPERCRITICAL FLUID CHROMATOGRAPH AND SAMPLE SUPPLY METHOD USED IN SUPERCRITICAL FLUID CHROMATOGRAPH

(71) Applicant: SHIMADZU CORPORATION, Kyoto (JP)

(72) Inventor: Katsuhiro Tanaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 888 days.

(21) Appl. No.: 17/617,494

(22) PCT Filed: Jun. 11, 2019

(86) PCT No.: PCT/JP2019/023157
§ 371 (c)(1),
(2) Date: Dec. 8, 2021

(87) PCT Pub. No.: WO2020/250318
PCT Pub. Date: Dec. 17, 2020

(65) Prior Publication Data
US 2022/0252557 A1   Aug. 11, 2022

(51) Int. Cl.
*G01N 30/38* (2006.01)
*B01D 11/02* (2006.01)
(Continued)

(52) U.S. Cl.
CPC ......... *G01N 30/38* (2013.01); *B01D 11/0203* (2013.01); *B01D 11/0207* (2013.01);
(Continued)

(58) Field of Classification Search
CPC ........ G01N 30/20; G01N 30/28; G01N 30/30; G01N 30/32; G01N 30/38; B01D 11/0203; B01D 11/0207
See application file for complete search history.

(56) References Cited

U.S. PATENT DOCUMENTS

| 2011/0306146 A1 | 12/2011 | Sidhu |
| 2019/0184319 A1 | 6/2019 | Tanaka |
| 2019/0285592 A1 | 9/2019 | Yamamoto |

FOREIGN PATENT DOCUMENTS

| CN | 109844520 A | 6/2019 |
| JP | 05-307026 A | 11/1993 |

(Continued)

OTHER PUBLICATIONS

Office Action in counterpart Chinese patent application 201980097052.6 issued on Jul. 4, 2023, and English machine translation thereof.
(Continued)

*Primary Examiner* — John Kim
(74) *Attorney, Agent, or Firm* — Renner, Otto, Boisselle & Sklar, LLP

(57) ABSTRACT

A supercritical fluid chromatograph includes a suction discharger that sucks and discharges a sample, a first sample loop connected to the suction discharger through a first flow path, a first flow path switcher that is connected to the first sample loop through a second flow path, a sample container connected to the second flow path through a third flow path when the first flow path switcher is in a first switch state, and a second flow path switcher connected to the second flow path through a fourth flow path when the first flow path switcher is in a second switch state. The fourth flow path is connected to a second sample loop when the second flow path switcher is in a third switch state, and the second sample loop is connected to an analysis flow path to which a solvent is supplied as a supercritical fluid when the second flow path switcher is in a fourth switch state.

7 Claims, 9 Drawing Sheets

(51) Int. Cl.
*G01N 30/20* (2006.01)
*G01N 30/30* (2006.01)
*G01N 30/32* (2006.01)

(52) U.S. Cl.
CPC ............. *G01N 30/20* (2013.01); *G01N 30/30* (2013.01); *G01N 30/32* (2013.01)

(56) References Cited

FOREIGN PATENT DOCUMENTS

| | | |
|---|---|---|
| JP | 2012-504238 A | 2/2012 |
| WO | 2018/025547 A1 | 2/2018 |

OTHER PUBLICATIONS

International Search Report for corresponding Application No. PCT/JP2019/023157, mailed Sep. 10, 2019.
Written Opinion for corresponding Application No. PCT/JP2019/023157, mailed Sep. 10, 2019 (English machine translation).

SUPERCRITICAL FLUID CHROMATOGRAPH AND SAMPLE SUPPLY METHOD USED IN SUPERCRITICAL FLUID CHROMATOGRAPH

TECHNICAL FIELD

The present invention relates to a supercritical fluid chromatograph and a sample supply method used in the supercritical fluid chromatograph.

BACKGROUND ART

As a method of analyzing a sample, there is supercritical Fluid Chromatography (SFC) with which a supercritical fluid is used as a mobile phase. The supercritical fluid has the properties of both liquid and gas and is characterized in having higher diffusibility and lower viscosity than liquid. A supercritical fluid chromatograph can analyze a sample at high speed, with high resolution or with high sensitivity by using a supercritical fluid having such properties as a solvent. In the supercritical fluid chromatograph, a loop injection method of introducing a sample loop holding a sample into an analysis flow path is employed.

Further, there is a supercritical fluid chromatograph including a collector for obtaining a specific sample from a sample detected by a detector by sorting. The below-mentioned Patent Document 1 discloses a supercritical fluid apparatus including a collection container at a position farther downstream than a detector.

In the supercritical fluid chromatograph that performs sorting, a pull-injection method which is one of the loop injection method is generally employed in order to supply a sample to an analysis flow path successively over multiple times. With the pull-injection method, a sample in a sample container is sucked by a sucking operation performed by a syringe. The sucked sample is supplied to a sample loop through a valve. Next, the valve is switched, so that the sample loop is incorporated into the analysis flow path to which a supercritical fluid is supplied as a solvent, and a sample held by the sample loop is supplied to the analysis flow path.

[Patent Document 1] WO 2018-025547 A1

SUMMARY OF INVENTION

Technical Problem

With the pull-injection method, it is necessary to fill a flow path including a sample loop with a rinse liquid before a sample is supplied to the sample loop. This is for controlling an amount of sample to be sucked and an amount of sample to be discharged by a syringe with high accuracy. It is necessary to supply a sample over multiple times in order to collect a specific sample by sorting. With the pull-injection method, it is necessary to fill the flow path including the sample loop with the rinse liquid as preparation for suction of a sample each time a sample is sucked. In this manner, with the supercritical fluid chromatograph that employs the pull-injection method, there is a problem that a period of time required until a new sample is supplied to the analysis flow path is long. In regard to sorting, the larger the number of times a sample is supplied is, the more significant this problem is.

With the pull-injection method, after all of the sample in the sample loop is sent out to the analysis flow path, a new sample is supplied to the sample loop. This is also the reason why a period of time required until a new sample is supplied to the analysis flow path is long in the supercritical fluid chromatograph that employs the pull-injection method. In regard to sorting, the larger the number of times a sample is supplied is, the more significant this problem is.

An object of the present invention is to shorten a period of time required until a new sample is supplied to an analysis flow path in a supercritical fluid chromatograph.

Solution to Problem

A supercritical fluid chromatograph according to one aspect of the present invention includes a suction discharger that sucks and discharges a sample, a first sample loop connected to the suction discharger through a first flow path, a first flow path switcher that is connected to the first sample loop through a second flow path, a sample container connected to the second flow path through a third flow path when the first flow path switcher is in a first switch state, and a second flow path switcher connected to the second flow path through a fourth flow path when the first flow path switcher is in a second switch state. The fourth flow path is connected to a second sample loop when the second flow path switcher is in a third switch state, and the second sample loop is connected to an analysis flow path to which a solvent is supplied as a supercritical fluid when the second flow path switcher is in a fourth switch state.

Advantageous Effects of Invention

With the present invention, a period of time required until a new sample is supplied to an analysis flow path in a supercritical fluid chromatograph can be shortened.

DESCRIPTION OF EMBODIMENTS

The configuration of a supercritical fluid chromatograph according to embodiments of the present invention will now be described with reference to the attached drawings.

(1) Overall Configuration of Supercritical Fluid Chromatograph

Figure 1:
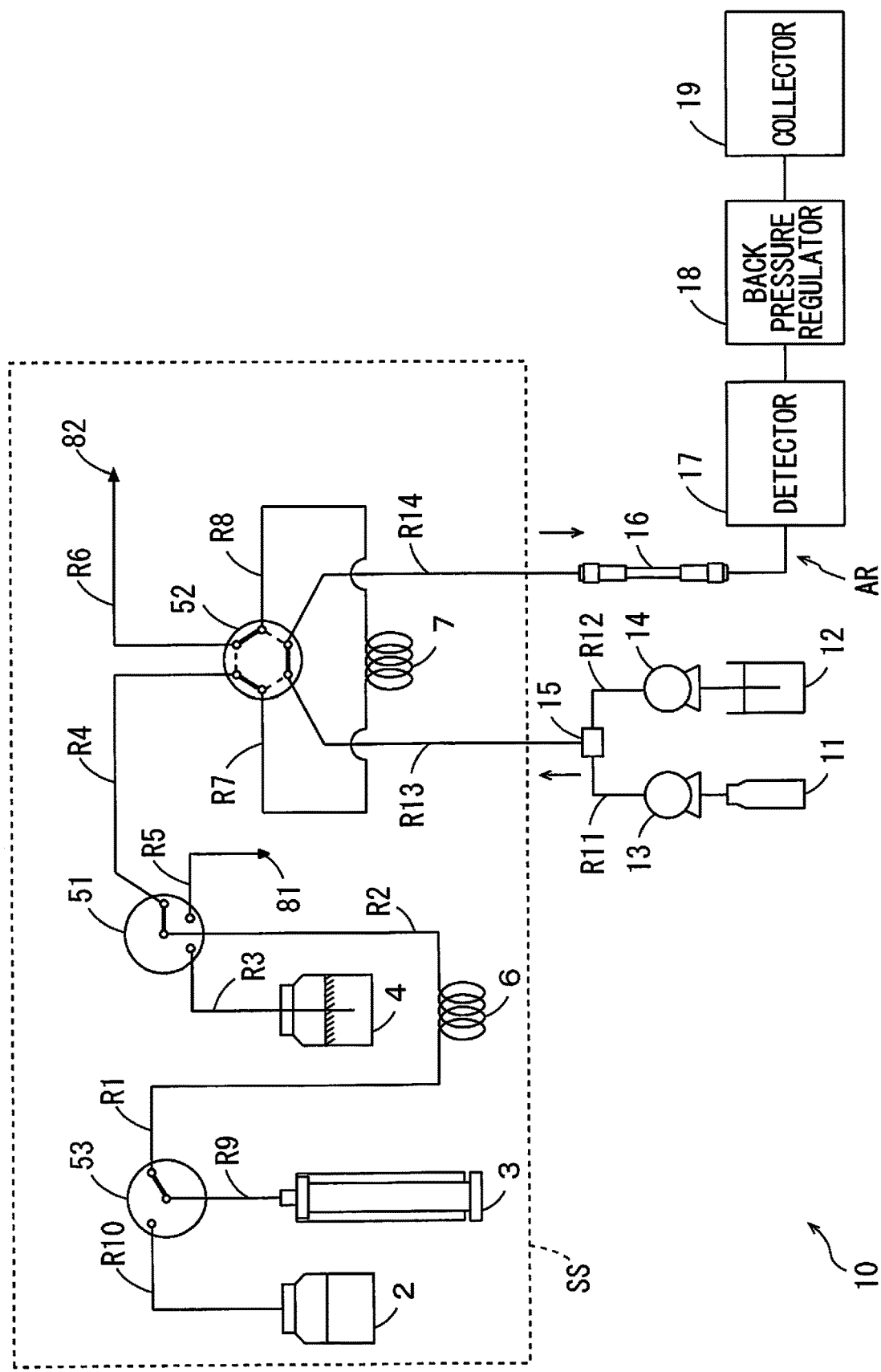
FIG. 1 is an overview of a supercritical fluid chromatograph according to the present embodiment.

FIG. 1 is an overview of the configuration of the supercritical fluid chromatograph 10 according to the present embodiment. The supercritical fluid chromatograph 10 includes a carbon dioxide bottle 11, a modifier container 12, a first pump 13, a second pump 14, a mixer 15, a sample supplier SS, a separation column 16, a detector 17, a Back Pressure Regulator (BPR) 18 and a collector 19.

Liquid carbon dioxide is stored in the carbon dioxide bottle 11. The first pump 13 is driven, so that the liquid carbon dioxide in the carbon dioxide bottle 11 is sent to a flow path R11. A modifier is stored in the modifier container 12. The second pump 14 is driven, so that the modifier in the modifier container 12 is sent to a flow path R12. As a modifier, an organic solvent such as methanol or ethanol is used.

The liquid carbon dioxide sent through the flow path R11 and the modifier sent through the flow path R12 are mixed by the mixer 15. A supercritical state of carbon dioxide is achieved at a relatively low temperature and a relatively low pressure. A modifier is used to enhance the solubility of a sample to be measured.

The liquid carbon dioxide and the modifier mixed by the mixer 15 are supplied to an analysis flow path AR as a mobile phase. During an analysis process, the pressure in the analysis flow path AR is adjusted to a value equal to or larger than 10 MPa by the back pressure regulator 18 provided at a position farther downstream than the detector 17. Further, the temperature of the analysis flow path AR is adjusted to an appropriate temperature (a value equal to or larger than 31.1 degrees) so as to put carbon dioxide in a supercritical state. Thus, the mobile phase supplied to the analysis flow path AR is in the supercritical fluid state.

The mobile phase obtained by mixing with use of the mixer 15 is sent to the sample supplier SS. In the sample supplier SS, a sample held by a second sample loop 7 is dissolved in the mobile phase flowing through the analysis flow path AR. The configuration of the sample supplier SS will be described below.

The mobile phase, which is a supercritical fluid and in which the sample is dissolved in a period during which the mobile phase passes through the second sample loop 7, is sent to the separation column 16. In the separation column 16, the sample is separated in a period during which the mobile phase passes through a stationary phase in the separation column 16. The mobile phase in which the sample is dissolved and which has flowed out from the separation column 16 is sent to the detector 17.

The mobile phase in which the sample is separated in the separation column 16 is supplied to the detector 17. The sample is detected by the detector 17. As the detector 17, an ultraviolet detector, a visible light detector or a fluorescence detector is used, for example.

The back pressure regulator 18 is provided at a position farther downward than the detector 17. As described above, the pressure in the analysis flow path AR is adjusted by control of the back pressure regulator 18. The collector 19 is provided at a position farther downward than the back pressure regulator 18. In the collector 19, a specific sample out of samples detected by the detector 17 is collected. In this manner, the supercritical fluid chromatograph 10 of the present embodiment detects a sample using the detector 17 and obtains a specific sample by sorting in the collector 19.

(2) Configuration of Sample Supplier

Next, the configuration of the sample supplier SS will be described. As shown in FIG. 1, the sample supplier SS includes a rinse container 2, a syringe 3, a sample container 4, a first sample loop 6 and a second sample loop 7. The rinse container 2 stores a rinse liquid. The syringe 3 sucks and discharges a rinse liquid or a sample. The sample container 4 stores a sample. The first sample loop 6 holds a sample sucked by the syringe 3. The first sample loop 6 is not incorporated into the analysis flow path AR and temporarily holds the sample in a process of supplying the sample. The second sample loop 7 holds a sample discharged by the syringe 3. The second sample loop 7 is incorporated into the analysis flow path AR, thereby supplying the sample held by the second sample loop 7 to the analysis flow path AR. A push-injection method is employed in the supercritical fluid chromatograph 10 of the present embodiment as a method of supplying a sample to the second sample loop 7.

The sample supplier SS further includes a first valve 51, a second valve 52 and a third valve 53. The first valve 51 is a 3-position rotary valve. A flow path R2, a flow path R3, a flow path R4 and a flow path R5 are connected to the first valve 51. It is possible to selectively connect the flow path R2 to any one of the flow path R3, the flow path R4 and the flow path R5 by switching the position of the first valve 51.

The flow path R2 is connected to one end of the first sample loop 6. The flow path R3 is connected to the sample container 4. The flow path R4 is connected to the second valve 52. The flow path R5 is connected to a first drain 81.

The second valve 52 is a 6-port 2-position switch valve. The flow path R4, a flow path R6, a flow path R7, a flow path R8, a flow path R13 and a flow path R14 are connected to the second valve 52. The second valve 52 is switched to one position of the two positions, whereby the flow path R4 and the flow path R7 are connected to each other, the flow path R6 and the flow path R8 are connected to each other, and the flow path R13 and the flow path R14 are connected to each other. The second valve 52 is switched to the other position of the two positions, whereby the flow path R4 and the flow path R6 are connected to each other, the flow path R7 and the flow path R13 are connected to each other, and the flow path R8 and the flow path R14 are connected to each other.

The flow path R7 is connected to one end of the second sample loop 7. The flow path R8 is connected to the other end of the second sample loop 7. The flow path R6 is connected to a second drain 82. The flow path R13 is connected to the mixer 15. The flow path R14 is connected to the separation column 16.

The third valve 53 is a 2-position rotary valve. A flow path R1, a flow path R9 and a flow path R10 are connected to the third valve 53. The two positions of the third valve 53 are switched, so that the flow path R9 can be selectively connected to the flow path R1 or the flow path R10.

The flow path R1 is connected to the end portion of the first sample loop 6 (the other end opposite to the one end to which the flow path R2 is connected). The flow path R9 is connected to the syringe 3. The flow path R10 is connected to the rinse container 2.

(3) Operation of Sample Supplier

Next, the operation of the sample supplier SS will be described with reference to FIGS. 2 to 9. The sample supplier SS supplies a sample successively over multiple times to the analysis flow path AR by performing the following operations A to H.

(Operation A: Suction of Rinse Liquid)

Figure 2:
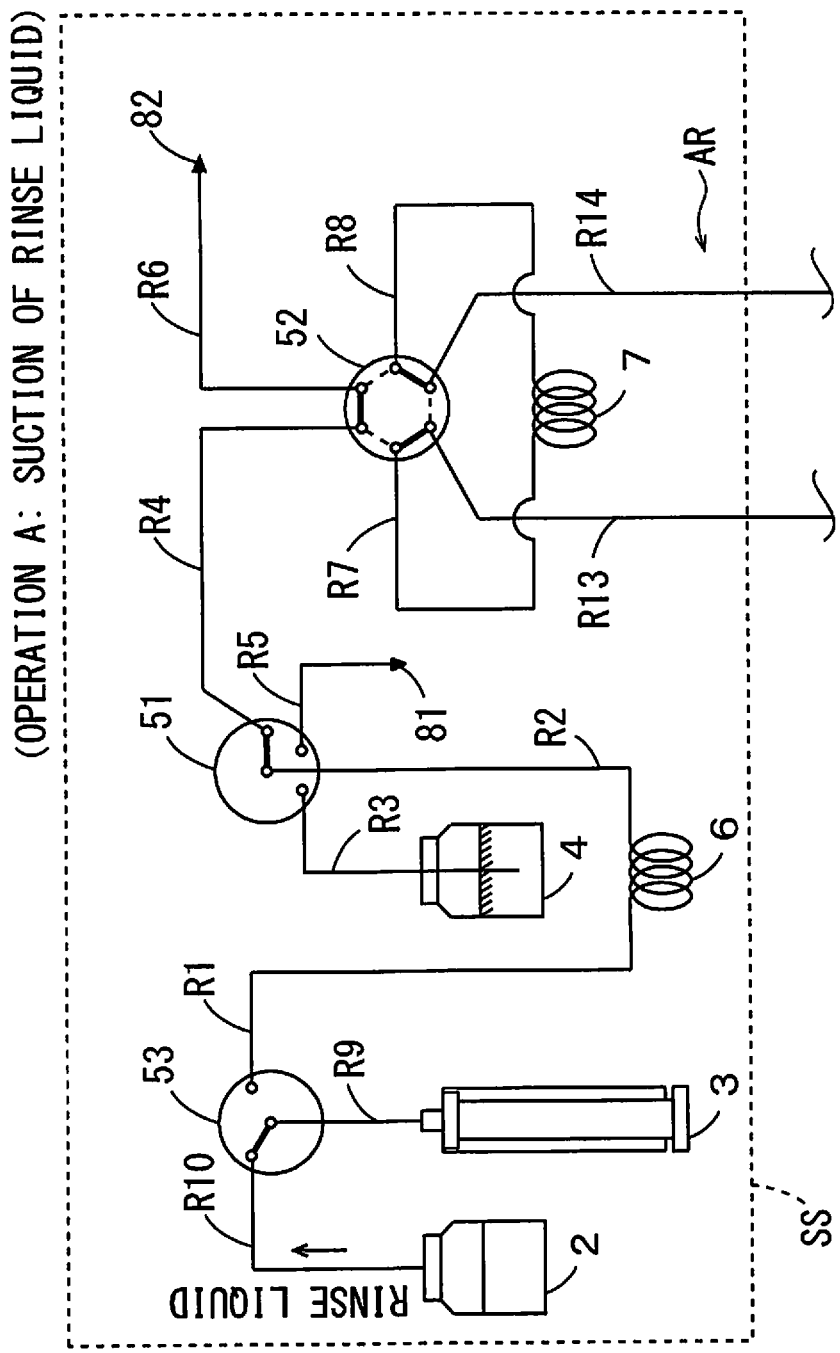
FIG. 2 is a diagram showing an operation A performed by a sample supplier.

FIG. 2 is a diagram showing the operation (operation A) of sucking a rinse liquid using the syringe 3. The first valve 51 is switched such that the flow path R2 and the flow path R4 are connected to each other. The second valve 52 is switched, such that the flow path R4 and the flow path R6 are connected to each other, the flow path R7 and the flow path R13 are connected to each other, and the flow path R8 and the flow path R14 are connected to each other. Thus, the second sample loop 7 is incorporated into the analysis flow path AR. The third valve 53 is switched such that the flow path R9 and the flow path R10 are connected to each other.

In the state shown in FIG. 2, the syringe 3 performs a sucking operation to suck the rinse liquid in the rinse container 2. The rinse liquid sucked from the rinse container 2 is sucked by the syringe 3 through the flow path R10 and the flow path R9.

(Operation B: Discharge of Rinse Liquid)

Figure 3:
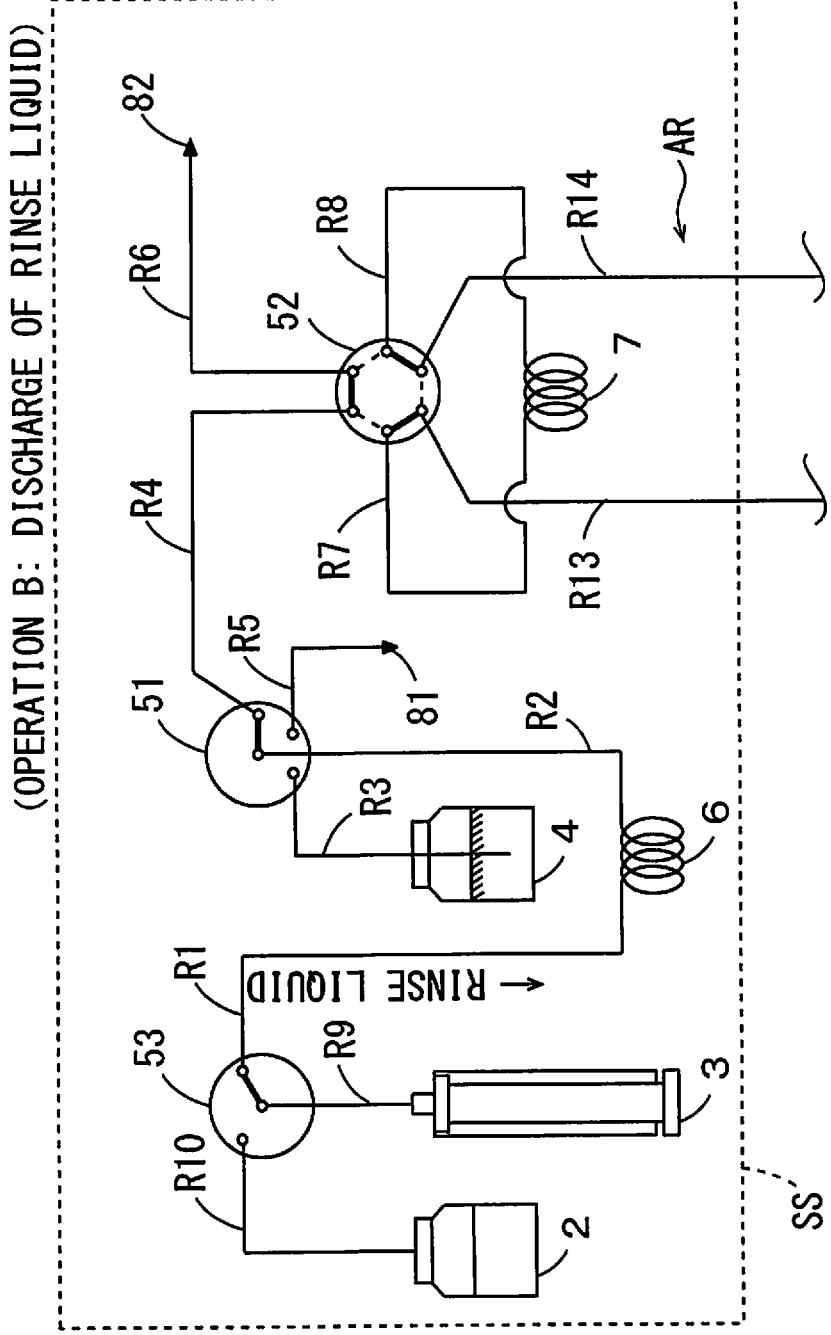
FIG. 3 is a diagram showing an operation B performed by the sample supplier.

FIG. 3 is a diagram showing the operation (operation B) of discharging a rinse liquid using the syringe 3. The first valve 51 and the second valve 52 maintain the state for the operation A of FIG. 2. That is, the second sample loop 7 is disconnected from a sample supply flow path including the flow path R4. The third valve 53 is switched such that the flow path R9 and the flow path R1 are connected to each other.

In the state shown in FIG. 3, the syringe 3 performs a discharging operation and discharges a rinse liquid in the syringe 3. The rinse liquid discharged from the syringe 3 flows out from the second drain 82 through the flow path R9, the flow path R1, the first sample loop 6, the flow path R2, the flow path R4 and the flow path R6. Thus, the flow path R9, the flow path R1, the first sample loop 6, the flow path R2, the flow path R4 and the flow path R6 are filled with the rinse liquid. The operation of supplying the rinse liquid ends when the operation A and the operation B are performed.

(Operation C: Suction of Sample)

Figure 4:
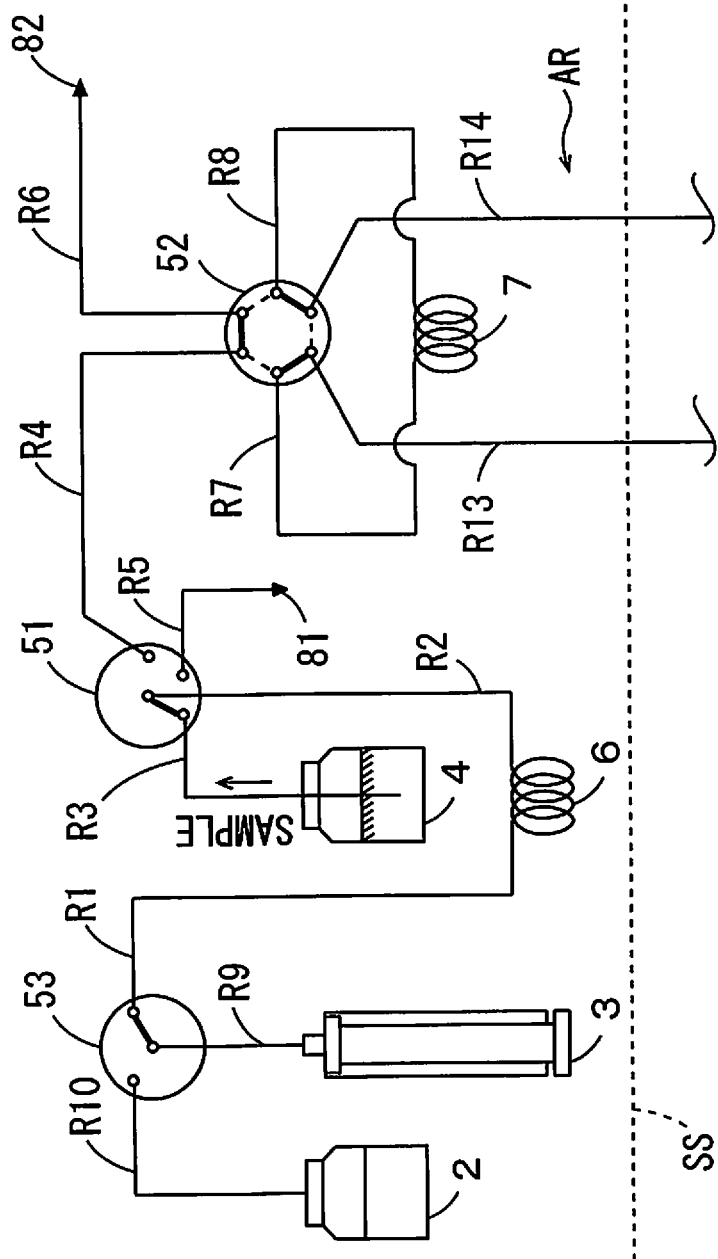
FIG. 4 is a diagram showing an operation C performed by the sample supplier.

FIG. 4 is a diagram showing an operation (operation C) of sucking a sample using the syringe 3. The first valve 51 is switched such that the flow path R2 and the flow path R3 are connected to each other. The second valve 52 and the third valve 53 maintain the state for the operation B of FIG. 3. That is, the second sample loop 7 is disconnected from the sample supply flow path including the flow path R4. The syringe 3 is connected to the flow path R1.

In the state shown in FIG. 4, the syringe 3 performs the sucking operation to suck a sample in the sample container 4. The sample sucked from the sample container 4 is supplied to the first sample loop 6 through the flow path R3 and the flow path R2.

Before the operation C is performed, the first valve 51 is temporarily switched to the state where the flow path R2 and the flow path R5 are connected to each other. The syringe 3 performs the sucking operation in this state, so that an air layer is formed between the rinse liquid in the flow path R2 supplied by the operation B and the sample sucked by the operation C. The air layer is formed, so that the sample and the rinse liquid are prevented from being mixed in the interface between the rinse liquid and the sample.

(Operation D: Suction of Rinse Liquid and Sample)

Figure 5:
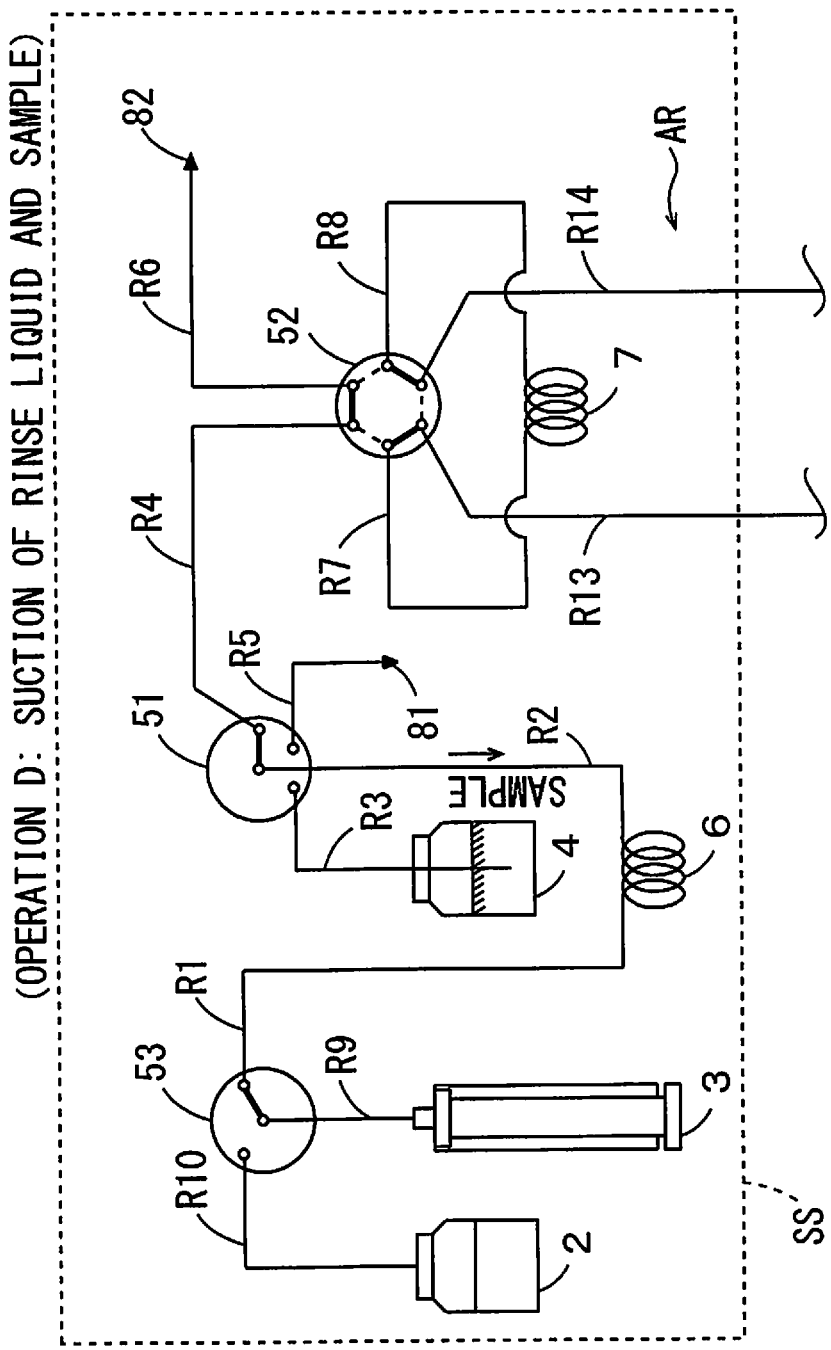
FIG. 5 is a diagram showing an operation D performed by the sample supplier.

FIG. 5 is a diagram showing an operation (operation D) of sucking a rinse liquid and a sample using the syringe 3. The first valve 51 is switched such that the flow path R2 and the flow path R4 are connected to each other. The second valve 52 and the third valve 53 maintain the state for the operation C of FIG. 4. That is, the second sample loop 7 is disconnected from the sample supply flow path including the flow path R4. The syringe 3 is connected to the flow path R1.

In the state shown in FIG. 5, the syringe 3 performs the sucking operation and sucks a sample held by the flow path R2 and a rinse liquid held by the flow path R4 and the flow path R6. With this sucking operation, the sample in the flow path R2 is supplied into the first sample loop 6. The sample is held in the first sample loop 6 by the operation C and the operation D.

Before the operation D is performed, the first valve 51 is temporarily switched to the state where the flow path R2 and the flow path R5 are connected to each other. The syringe 3 performs the sucking operation in this state, so that an air layer is formed between a sample liquid supplied by the operation C and the rinse liquid in the flow path R4 to be sucked by the operation D.

(Operation E: Injection of Sample into Second Sample Loop)

Figure 6:
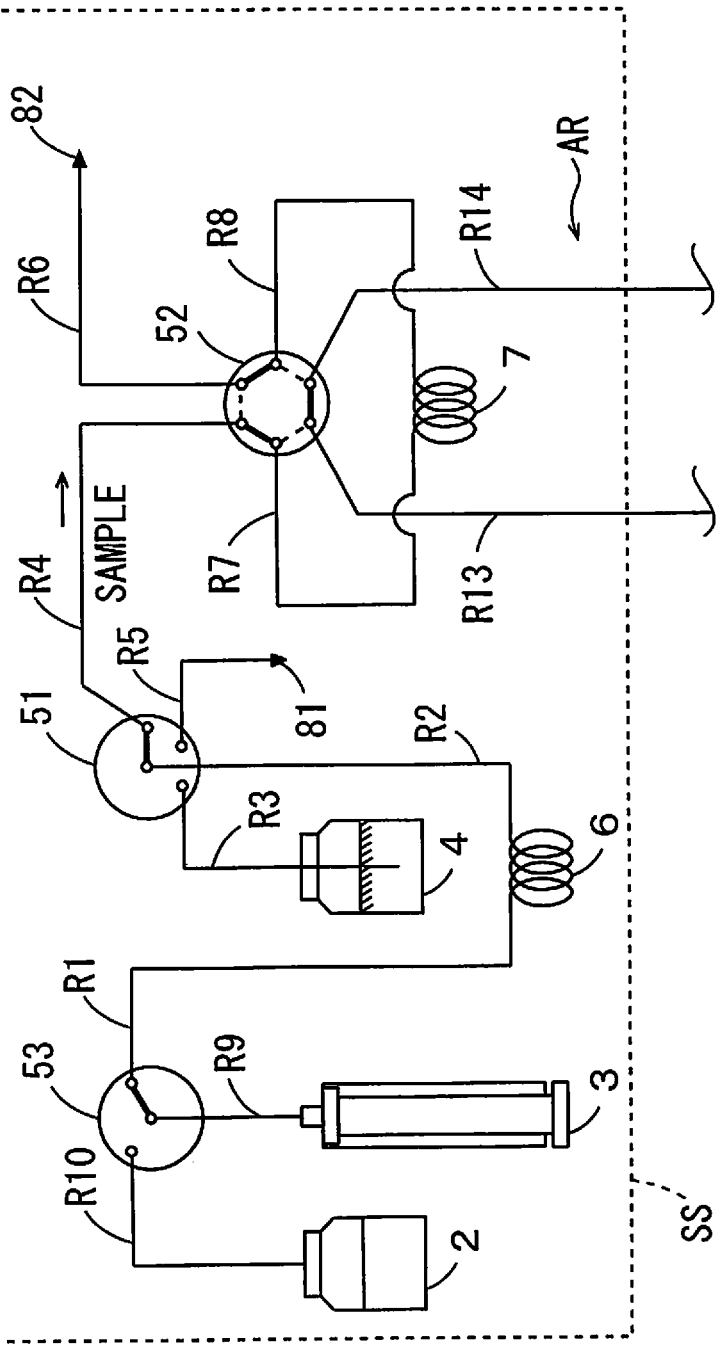
FIG. 6 is a diagram showing an operation E performed by the sample supplier.

FIG. 6 is a diagram showing an operation (operation E) of injecting a sample into the second sample loop 7 using the syringe 3. The first valve 51 and the third valve 53 maintain the state for the operation D of FIG. 5. That is, the flow path R2 is connected to the flow path R4. The syringe 3 is connected to the flow path R1. The second valve 52 is switched, such that the flow path R4 and the flow path R7 are connected to each other, the flow path R6 and the flow path R8 are connected to each other, and the flow path R13 and the flow path R14 are connected to each other. That is, the second sample loop 7 is disconnected from the analysis flow path AR and is incorporated into the sample supply path in the sample supplier SS.

In the state shown in FIG. 6, the syringe 3 performs a discharging operation and sends a sample held by the first sample loop 6. With this discharging operation, the sample held by the first sample loop 6 is injected into the second sample loop 7 through the flow path R2, the flow path R4 and the flow path R7. With this operation E, the sample is held in the second sample loop 7.

(Operation F: Incorporation of Second Sample Loop into Analysis Flow Path)

Figure 7:
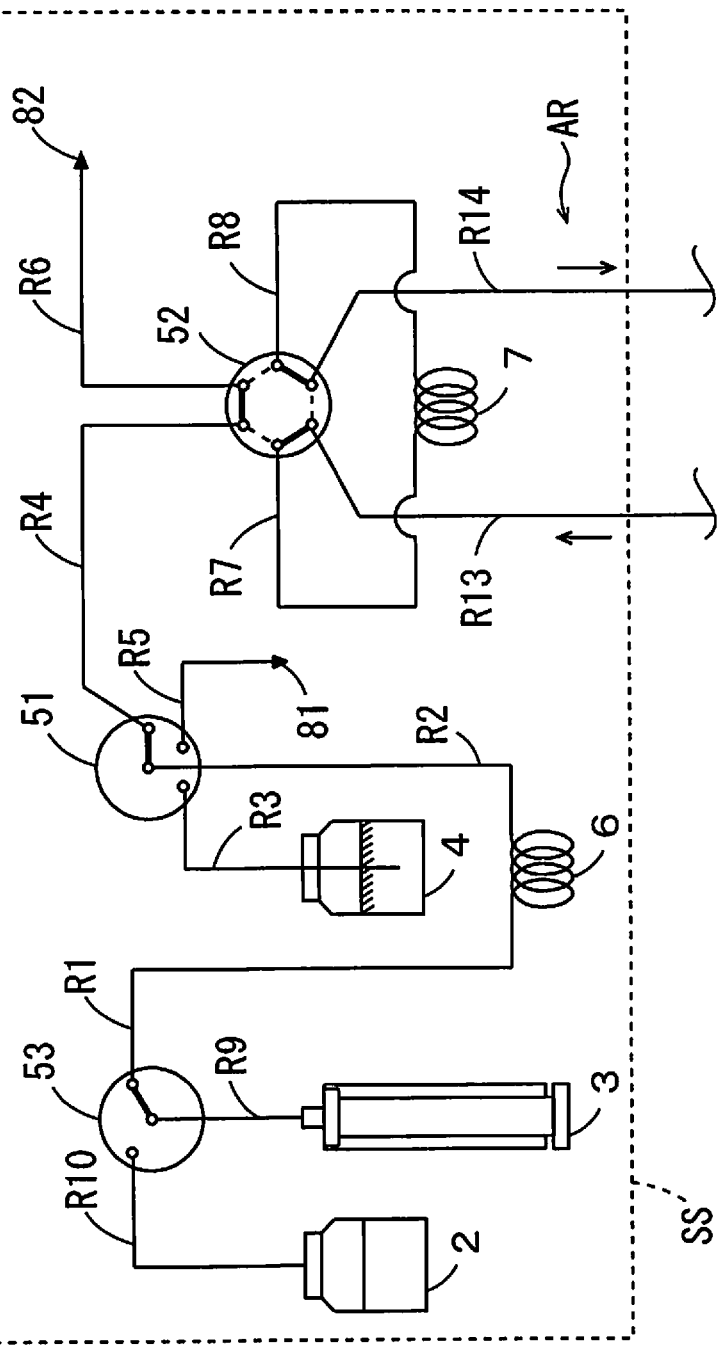
FIG. 7 is a diagram showing an operation F performed by the sample supplier.

FIG. 7 is a diagram showing an operation (operation F) of incorporating the second sample loop 7 holding a sample into the analysis flow path AR. The first valve 51 and the third valve 53 maintain the state for the operation E of FIG. 6. That is, the flow path R2 is connected to the flow path R4. The syringe 3 is connected to the flow path R1. The second valve 52 is switched, such that the flow path R4 and the flow path R6 are connected to each other, the flow path R7 and the flow path R13 are connected to each other, and the flow path R8 and the flow path R14 are connected to each other. That is, the second sample loop 7 is incorporated into the analysis flow path AR.

In the state shown in FIG. 7, a mobile phase, which is a supercritical fluid, is supplied to the second sample loop 7 through the flow path R13 and the flow path R7. The sample in the second loop 7 is dissolved in the mobile phase and sent to the separation column 16 shown in FIG. 1 through the flow path R8 and the flow path R14. The sample separated by the separation column 16 is sent to the detector 17 together with the mobile phase, and a detection process is executed on the sample. Further, a specific sample detected by the detector 17 is collected by the collector 19.

(Operation of Supplying New Sample)

As described above, after the second sample loop 7 is incorporated into the analysis flow path AR by the operation F, an analysis process is executed on the sample in the second sample loop 7 in the analysis flow path AR. During this analysis process, the second valve 52 maintains the state shown in FIG. 7. That is, during the analysis process, the second valve 52 is maintained in a state where the flow path R4 and the flow path R6 are connected to each other, the flow path R7 and the flow path R13 are connected to each other, and the flow path R8 and the flow path R14 are connected to each other.

In this state, the sample supplier SS performs an operation of supplying a new sample. During the operation of supplying a new sample, the third valve 53 maintains a state where the flow path R9 and the flow path R1 are connected to each other. First, the first valve 51 is switched to a state where the flow path R2 and the flow path R5 are connected to each other. The syringe 3 performs a sucking operation in this state, whereby air is sucked from the first drain 81, and an air layer is formed in a downstream portion of the rinse liquid held by the flow path R2 (a position at which the syringe 3 is arranged is assumed in an upstream portion in the sample supplier SS.)

Subsequently, the first valve 51 is switched to a state where the flow path R2 and the flow path R3 are connected to each other. The syringe 3 performs the sucking operation in this state, so that a sample is sucked from the sample container 4. Thus, the sample is supplied to the flow path R2 following the air layer. The first valve 51 is switched again to the state where the flow path R2 and the flow path R5 are connected to each other. The syringe 3 performs the sucking operation in this state, so that an air layer is formed in a downstream portion of the sample held by the flow path R2. The syringe 3 further performs the sucking operation, so that the sample in the flow path R2 is held in the first sample loop 6.

(Operation G: Exhaustion of Carbon Dioxide)

Figure 8:
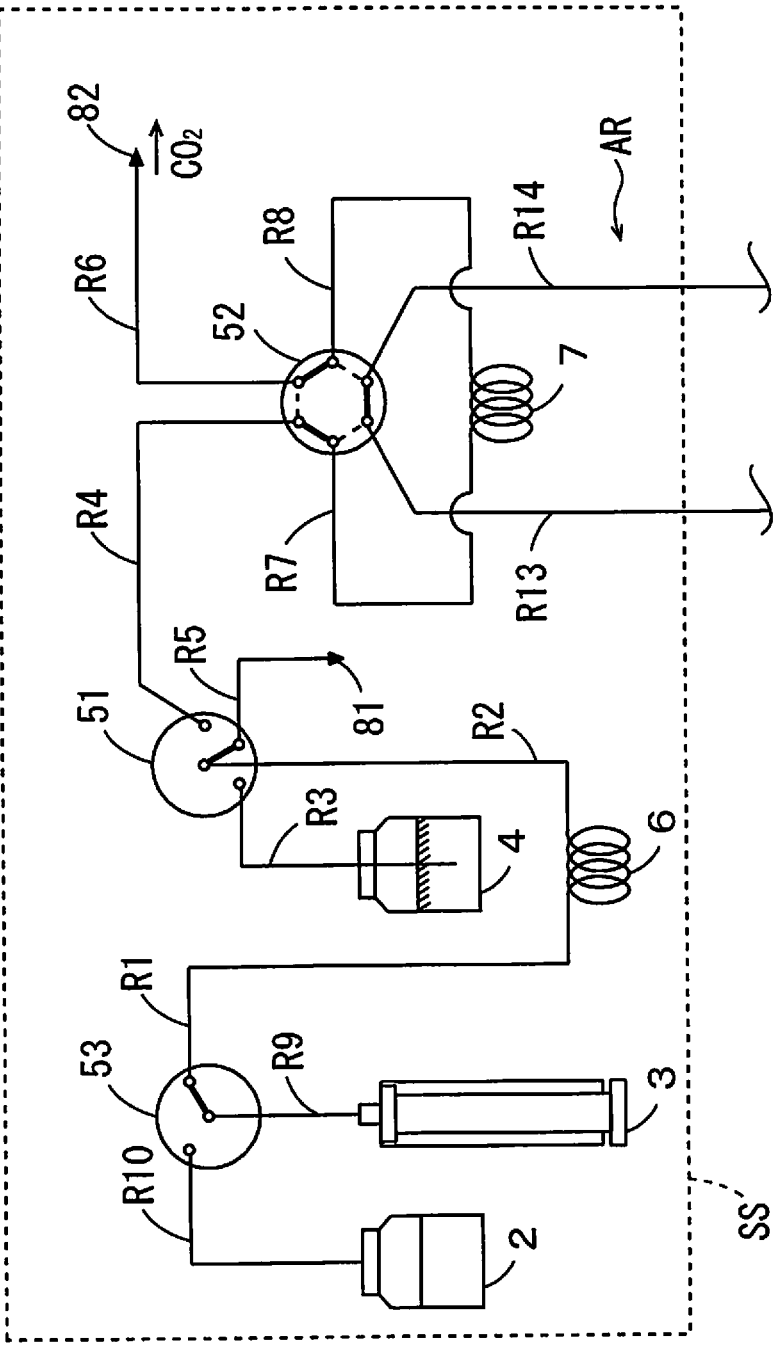
FIG. 8 is a diagram showing an operation G performed by the sample supplier.

FIG. 8 is a diagram showing an operation (operation G) of exhausting carbon dioxide. The operation G is performed since the second sample loop 7 is incorporated again into the sample supply path in the sample supplier SS after the analysis process. During the operation G, the third valve 53 maintains a state where the flow path R1 and the flow path R9 are connected to each other. Before the second valve 52 is switched to the state of FIG. 8, the first valve 51 is first switched such that the flow path R2 and the flow path R5 are connected to each other. Thus, with the flow path R9, the flow path R1, the first sample loop 6 and the flow path R2 filled with a rinse liquid and a sample, these flow paths are disconnected from the flow path R4.

Subsequently, the second valve 52 is switched to the state of FIG. 8. That is, the second valve 52 is switched, such that the flow path R4 and the flow path R7 are connected to each other, the flow path R6 and the flow path R8 are connected to each other, and the flow path R13 and the flow path R14 are connected to each other. Thus, a supercritical fluid in the flow path R7, the second sample loop 7 and the flow path R8 flows out to the flow path R4 and the flow path R6. Since the flow path R6 is connected to the second drain 82, carbon dioxide in a supercritical fluid is evaporated under atmospheric pressure. Carbon dioxide in the flow path R4, the flow path R7, the second sample loop 7, the flow path R8 and the flow path R6 is exhausted from the second drain 82. When exhaustion of carbon dioxide ends, the process proceeds to the next operation H.

(Operation H: Injection of New Sample into Second Sample Loop)

Figure 9:
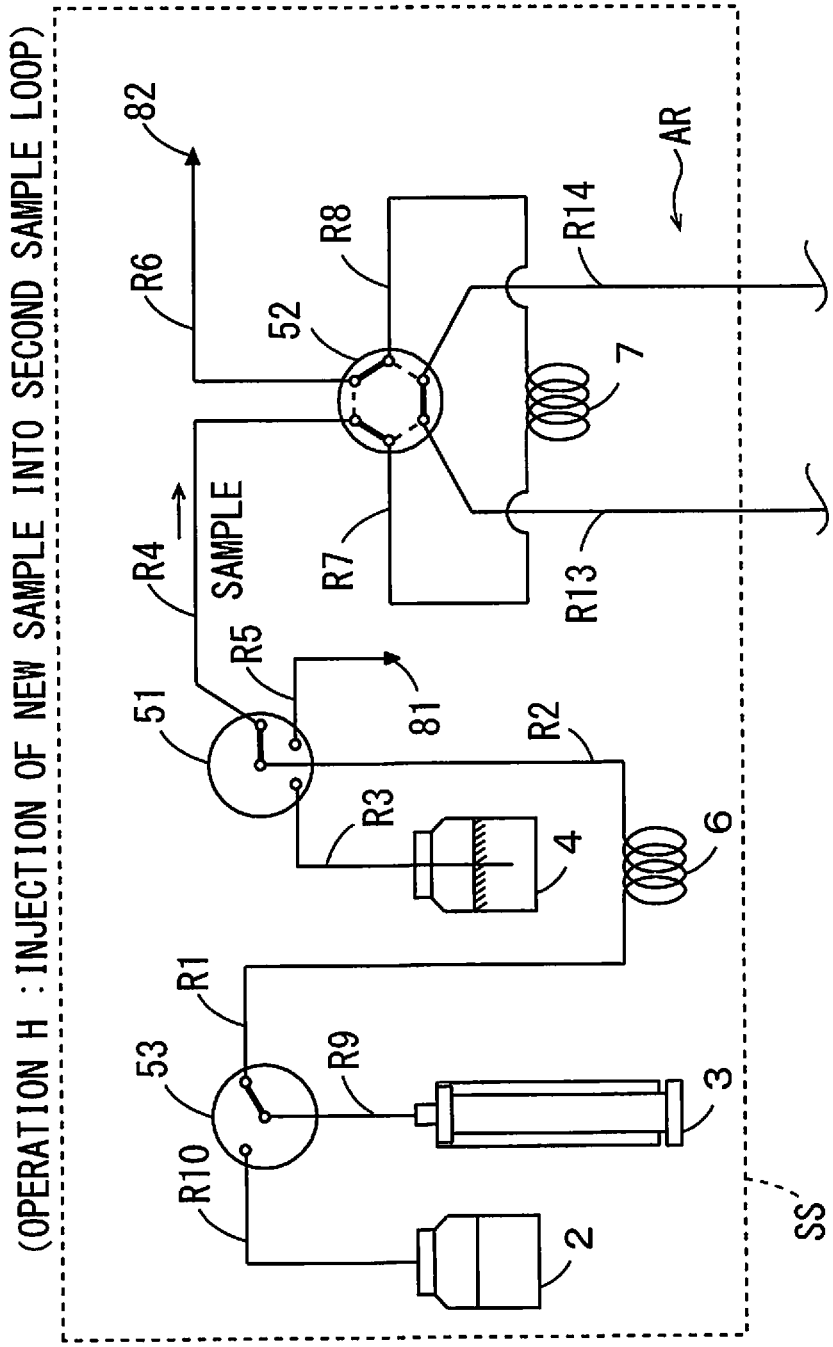
FIG. 9 is a diagram showing an operation H performed by the sample supplier.

FIG. 9 is a diagram showing an operation (operation H) of supplying a sample to the second sample loop 7 again. During the operation H, the third valve 53 maintains a state where the flow path R1 and the flow path R9 are connected to each other. During the operation H, the second valve 52 maintains the state for the operation G of FIG. 8. That is, the second sample loop 7 is connected to the flow path R4 and the flow path R6. The first valve 51 is switched such that the flow path R2 and the flow path R4 are connected to each other. The syringe 3 performs the discharging operation in this state, so that a sample held by the first sample loop 6 is injected into the second sample loop 7 through the flow path R2, the flow path R4 and the flow path R7. That is, the sample held by the first sample loop 6 during execution of an analysis process by the operation F is injected into the second sample loop 7 during the operation H. This operation is similar to the operation E.

After the operation H is performed, the above-mentioned operation F is performed, and an analysis process is performed on a newly supplied sample. Further, during execution of the analysis process on the newly supplied sample, the above-mentioned operation (the operation of supplying a new sample) is performed again, and another sample is held by the first sample loop 6. Such processes are repeated, and the sample is injected into the second sample loop 7 successively over multiple times. Then, the sample is supplied to the analysis flow path AR successively over multiple times, and a detection process and a collection process are executed successively.

In this manner, with the supercritical fluid chromatograph 10 of the present embodiment, a sample is supplied successively over multiple times, and the detection process and the collection process are performed repeatedly. At this time, as described above, a rinse liquid is supplied by the sample supplier SS only the first time. It is necessary to fill a flow path from which a sample is to be sucked with liquid in order to enhance accuracy of a suction amount and a discharge amount of sample. As described above, the sample supplier SS of the present embodiment executes the process of sucking (operation A) and the operation of discharging (operation B) a rinse liquid using the syringe 3 only the first time. Thus, in a case where the supercritical fluid chromatograph 10 of the present embodiment executes the process of supplying a sample is executed over multiple times, a processing period of time can be greatly shortened.

Further, as described above, the supercritical fluid chromatograph 10 of the present embodiment can perform the operation of supplying a new sample during execution of the analysis process by the operation F. Thus, in a case where the supercritical fluid chromatograph 10 of the present embodiment executes the process of supplying a sample over multiple times, a processing period of time can be greatly shortened.

(4) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the syringe 3 is an example of a suction discharger, and the flow paths R1 to R6 are examples of first to sixth flow paths. Further, the first valve 51 is an example of a first flow path switcher, and the second valve 52 is an example of a second flow path switcher.

Further, in the above-mentioned embodiment, the state in which the first valve 51 is switched such that the flow path R2 and the flow path R3 are connected to each other is an example of a first switch state. Further, the state in which the first valve 51 is switched such that the flow path R2 and the flow path R4 are connected to each other is an example of a second switch state. Further, the state in which the second valve 52 is switched such that the flow path R4 and the flow path R7 are connected to each other and the flow path R6 and the flow path R8 are connected to each other is an example of a third switch state. Further, the second valve 52 is switched such that the flow path R4 and the flow path R6 are connected to each other and the second sample loop 7 is incorporated into the analysis flow path AR is an example of a fourth switch state. Further, the state in which the first valve 51 is switched such that the flow path R2 and the flow path R5 are connected to each other is an example of a fifth switch state.

As each of various elements recited in the claims, various other elements having configurations or functions described in the claims can be also used.

(5) Other Embodiments

In the above-mentioned embodiment, the supercritical fluid chromatograph 10 includes the collector 19 and obtains a specific sample by sorting, by way of example. The present invention can be applied to a supercritical fluid chromatograph 10 not including the collector 19. Even in this case, in a case where a sample is supplied successively over multiple times, and then an analysis process is executed, a processing period of time can be shortened.

In the above-mentioned embodiment, the one sample container 4 is connected to the first valve 51, by way of example. In another example, a plurality of sample containers may be connected to a first valve 51 through a plurality of flow paths connected to the first valve 51. A position of the first valve 51 is switched, so that a sample is sucked from the plurality of these sample containers. Thus, the sample stored in the plurality of sample containers can be supplied to an analysis flow path AR.

While preferred embodiments of the present invention have been described above, it is to be understood that variations and modifications will be apparent to those skilled in the art without departing the scope and spirit of the present invention.

(6) Aspects

It is understood by those skilled in the art that the plurality of above-mentioned illustrative embodiments are specific examples of the below-mentioned aspects.

(Item 1) A supercritical fluid chromatograph according to one aspect includes a suction discharger that sucks and discharges a sample, a first sample loop connected to the suction discharger through a first flow path, a first flow path switcher that is connected to the first sample loop through a second flow path, a sample container connected to the second flow path through a third flow path when the first flow path switcher is in a first switch state, and a second flow path switcher connected to the second flow path through a fourth flow path when the first flow path switcher is in a second switch state, wherein the fourth flow path is connected to a second sample loop when the second flow path switcher is in a third switch state, and the second sample loop is connected to an analysis flow path to which a solvent is supplied as a supercritical fluid when the second flow path switcher is in a fourth switch state.

The first flow path switcher is put in a state other than the second switch state, so that the flow path including the first sample loop is disconnected from the fourth flow path. Thus, the liquid in the first flow path, the first sample loop and the second flow path can be held also during a period in which the second sample loop is connected to the analysis flow path. Because the step of filling the flow path including the first sample loop with liquid before a new sample is supplied to the first sample loop does not have to be performed, a period of time required until the new sample is supplied to the analysis flow path can be shortened.

(Item 2) The supercritical fluid chromatograph according to item 1, wherein a sample in the sample container may be sucked by the suction discharger and a sample may be held by the first sample loop with the first flow path switcher in the first switch state when the second sample loop is connected to the analysis flow path with the second flow path switcher in the fourth switch state.

During a period in which the second sample loop is connected to the analysis flow path and the analysis process is executed, a sample can be held in the first sample loop. Thus, a period of time required until the new sample is supplied to the analysis flow path can be shortened.

(Item 3) The supercritical fluid chromatograph according to item 1 or 2 may further include a detector that detects a sample supplied to the analysis flow path, and a collector that collects a specific sample detected by the detector, wherein the supercritical fluid chromatograph may collect the specific sample using the collector based on a sample supplied to the analysis flow path over multiple times.

In a process of supplying a sample to the analysis flow path over multiple times and obtaining a specific sample by sorting, a period of time required for collection of the specific sample can be shortened.

(Item 4) The supercritical fluid chromatograph according to item 1 may further include a first drain connected to the second flow path through a fifth flow path when the first flow path switcher is in a fifth switch state.

It is possible to supply air to the second flow path by putting the first flow path switcher in the fifth switch state. An air layer can be generated between a sample and liquid other than the sample.

(Item 5) The supercritical fluid chromatograph according to item 1 may further include a second drain connected to the second sample loop through a sixth flow path when the second flow path switcher is in the third switch state.

It is possible to release a supercritical fluid in the second sample loop after the analysis process under atmospheric pressure by putting the second flow path switcher in the third switch state.

(Item 6) A sample supply method used in a supercritical fluid chromatograph according to another aspect includes the steps of connecting a suction discharger and a sample container to each other, sucking a sample in the sample container using the suction discharger and causing a first sample loop arranged between the suction discharger and the first flow path switcher to hold a sample by putting a first flow path switcher in a first switch state, connecting the first flow path switcher and a second flow path switcher to each other using a flow path by putting the first flow path switcher in a second switch state, and connecting the first sample loop and a second sample loop to each other, discharging a sample held in the first sample loop using the suction discharger and injecting a sample into the second sample loop by putting the second flow path switcher in a third switch state, and disconnecting the second sample loop from the first sample loop and connecting the second sample loop to an analysis flow path to which a solvent is supplied as a supercritical fluid by putting the second flow path switcher in a fourth switch state.

The first flow path switcher is put in a state other than the second switch state, so that the first flow path switcher and the second flow path switcher are disconnected from each other. Thus, the liquid in the flow path including the first sample loop can be held also during a period in which the second sample loop is connected to the analysis flow path. Because the step of filling the flow path including the first sample loop with liquid before a new sample is supplied to the first sample loop does not have to be performed, a period of time required until the new sample is supplied to the analysis flow path can be shortened.

(Item 7) The sample supply method used in a supercritical fluid chromatograph according to item 6 may further include the step of sucking a new sample in the sample container using the suction discharger and causing the first sample loop to hold a new sample with the first flow path switcher in the first switch state, when a sample is being supplied to the analysis flow path with the second flow path switcher in the fourth switch state.

A sample can be held in the first sample loop during a period in which the second sample loop is connected to the analysis flow path and the analysis process is executed. Thus, a period of time required until the new sample is supplied to the analysis flow path can be shortened.

(Item 8) The sample supply method used in a supercritical fluid chromatograph according to item 6 or 7 may further include repeatedly performing the steps of detecting a sample supplied to the analysis flow path, and collecting a detected specific sample.

In a process of supplying a sample to the analysis flow path over multiple times and obtaining a specific sample by sorting, a period of time required for collection of the specific sample can be shortened.

The invention claimed is:

1. A supercritical fluid chromatograph comprising:
a suction discharger that sucks and discharges a sample;
a first sample loop having one end connected to the suction discharger through a first flow path and having another end connected to a second flow path;
the first flow path having one end connected to the suction discharger and having another end connected to the one end of the first sample loop;
the second flow path having one end connected to the another end of the first sample loop and having another end connected to a first flow path switcher;
the first flow path switcher that is constantly connected to the another end of the first sample loop through the second flow path;
a third flow path having one end connected to the first flow path switcher and having another end connected to a sample container;
the sample container connected to the second flow path through the third flow path when the first flow path switcher is in a first switch state;
a fourth flow path having one end constantly connected to the first flow path switcher and having another end constantly connected to a second flow path switcher;
the second flow path switcher connected to the second flow path through the fourth flow path when the first flow path switcher is in a second switch state; and
a second sample loop connected to the second flow path switcher;
wherein the second sample loop is connected to the fourth flow path when the second flow path switcher is in a third switch state, and the second sample loop is connected to an analysis flow path to which a solvent is supplied as a supercritical fluid when the second flow path switcher is in a fourth switch state; and
wherein a sample in the sample container is sucked by the suction discharger and a sample is held by the first sample loop with the first flow path switcher in the first switch state when the second sample loop is connected to the analysis flow path with the second flow path switcher in the fourth switch state.

2. The supercritical fluid chromatograph according to claim 1, further comprising:
a detector that detects a sample supplied to the analysis flow path; and
a collector that collects a specific sample detected by the detector, wherein
the supercritical fluid chromatograph collects the specific sample using the collector based on a sample supplied to the analysis flow path over multiple times.

3. The supercritical fluid chromatograph according to claim 1, further comprising a first drain connected to the second flow path through a fifth flow path when the first flow path switcher is in a fifth switch state.

4. The supercritical fluid chromatograph according to claim 1, further comprising a second drain connected to the second sample loop through a sixth flow path when the second flow path switcher is in the third switch state.

5. The supercritical fluid chromatograph according to claim 1, wherein the first sample loop is disconnected from the fourth flow path by switching the first flow path switcher, and carbon dioxide in the second sample loop is exhausted with the second flow path switcher in the third switch state.

6. A sample supply method used in a supercritical fluid chromatograph, including the steps of:
connecting a suction discharger and a sample container to each other, sucking a sample in the sample container using the suction discharger and causing a first sample loop arranged between the suction discharger and a first flow path switcher to hold a sample by putting the first flow path switcher in a first switch state;
connecting the first flow path switcher and a second flow path switcher to each other using a flow path by putting the first flow path switcher in a second switch state, and connecting the first sample loop and a second sample loop to each other, discharging a sample held in the first sample loop using the suction discharger and injecting a sample into the second sample loop by putting the second flow path switcher in a third switch state, wherein:
the first sample loop has one end connected to the suction discharger through a first flow path and has another end connected to a second flow path;
the first flow path has one end connected to the suction discharger and having another end connected to the one end of the first sample loop;
the second flow path has one end connected to the another end of the first sample loop and has another end connected to the first flow path switcher;
the first flow path switcher is constantly connected to the another end of the first sample loop through the second flow path;
a third flow path has one end connected to the first flow path switcher and has another end connected to the sample container;
the sample container is connected to the second flow path through the third flow path when the first flow path switcher is in the first switch state;
a fourth flow path has one end constantly connected to the first flow path switcher and has another end constantly connected to the second flow path switcher;

the second flow path switcher is connected to the second flow path through the fourth flow path when the first flow path switcher is in the second switch state; and the second sample loop is connected to the second flow path switcher;

the second sample loop is connected to the fourth flow path when the second flow path switcher is in the third switch state; and disconnecting the second sample loop from the first sample loop and connecting the second sample loop to an analysis flow path to which a solvent is supplied as a supercritical fluid by putting the second flow path switcher in a fourth switch state; sucking a new sample in the sample container using the suction changer and causing the first sample loop to hold a new sample with the first flow path switcher in the first switch state when a sample is being supplied to the analysis flow path with the second flow path switcher in the fourth switch state.

7. The sample supply method used in a supercritical fluid chromatograph according to claim 6, further including repeatedly performing the steps of:

detecting a sample supplied to the analysis flow path; and collecting a detected specific sample.

* * * * *